Patented Jan. 9, 1951

2,537,766

UNITED STATES PATENT OFFICE 2,537,766

ADHESIVE COMPOSITION CONTAINING ISOBUTYLENE-CONJUGATED DIOLEFIN COPOLYMER

John B. Kirkland, Leonia, N. J., and Raymond R. Lamm, Philadelphia, Pa., assignors to The Patent and Licensing Corporation, New York, N. Y., a corporation of Massachusetts No Drawing. Application January 29, 1949, Serial No. 73,658

8 Claims. (Cl. 260—27)

This invention relates to adhesive cements of the type comprising a synthetic elastomer and a volatile solvent therefor and is more particularly concerned with an adhesive cement wherein the synthetic elastomer is an isobutylene-conjugated diolefin copolymer containing a small amount of chemical saturation, known commercially as butyl rubber.

The term butyl rubber is applied to isobutylene copolymers resulting from the copolymerization of isobutylene and a conjugated diolefin, such as butadiene, isoprene, and the like. These copolymers are characterized by low chemical unsaturation as compared with natural rubber or synthetic elastomers of the butadiene type, such as butadiene-styrene copolymers, polychloroprene and similar elastomeric materials. Isobutylene-conjugated diolefin copolymers are, however, vulcanizable to a certain extent by reason of their unsaturation and differ in important respects from isobutylene polymers, such as polyisobutylene, which contain substantially no unsaturation and are essentially non-vulcanizable. A form of butyl rubber commercially available today is designated GR-I and is an isobutylene-isoprene copolymer comprising about 98% isobutylene and 2% isoprene. Attempts made heretofore to prepare adhesive cements of the solvent type employing butyl rubber as the rubbery component have not resulted in a generally satisfactory product. While butyl rubber has excellent aging characteristics, which is important in an adhesive cement, butyl rubber cements made according to conventional adhesive cement formulations exhibit low heat strength or poor specific adhesion. By heat strength is meant the retention of bonding properties at elevated temperatures. An adhesive having low heat strength rapidly loses its bonding properties under the influence of heat while an adhesive having high heat strength does not fail even at temperatures of 200° F. or above.

Specific adhesion, as applied to adhesive cements, is a measure of the adhesion of an adhesive to a surface. When two surfaces are bonded together by an adhesive and the surfaces subsequently pulled apart, an adhesive having poor specific adhesion will pull away from a substantial portion of one or the other of the surfaces, while an adhesive having a good specific adhesion will adhere to both surfaces and the line of rupture will be within the body of the adhesive itself.

It is an object of this invention to provide an improved adhesive cement of the solvent type containing butyl rubber.

It is a further object of the invention to provide a butyl rubber adhesive cement having a high heat strength and good specific adhesion.

Other objects and features of the invention will be apparent from the following description.

In accordance with our invention we provide an adhesive cement comprising butyl rubber, a volatile solvent, comminuted fibrous material, and at least 50 parts by weight, per 100 parts of butyl rubber, of a resinous material comprising polymerized rosin. Preferably, we use between 50 and 100 parts by weight of the resinous material per 100 parts of butyl rubber and we have found 75 parts by weight of the resinous material to be particularly effective.

Preferably, but not necessarily, we also incorporate a small quantity of a non-sulfur vulcanizing agent such as a dioxime, e. g. p-quinone dioxime, and the compound sold commerically under the name "Polyac." When the vulcanizing agent is incorporated in the butyl rubber under the influence of heat and before the butyl rubber is dissolved in the solvent, an increase in the strength of the resulting adhesive is obtained. An adhesive cement made according to our invention has excellent specific adhesion, high heat strength and exhibits other desirable properties. We have found our adhesive particularly useful as a construction adhesive, suitable, for example for use with acoustical tile, pipe and insulation hangers, and for general home repairs.

Polymerized rosin, one commercial form of which is sold under the name "Poly-pale Resin", is a hard, brittle resinous material, and has a softening point (ASTM ring and ball) of about 200° F., an acid number of 150–156 and a saponification number of 157–163. While we prefer to use polymerized rosin as the only resinous component of our adhesive, we may also use mixtures of polymerized rosin and other resinous materials compatible therewith. For example, we may use with the polymerized rosin an oil-soluble phenol-aldehyde resin, such as a resin formed by the condensation of an alkylated phenol, e. g. tert. butyl phenol, and formaldehyde. When such other resinous materials are used in combination with polymerized rosin we prefer that the polymerized rosin comprise at least 50% of the total resinous material employed.

The amount of non-sulfur vulcanizing agent, when used, should be between 0.1 and 1.5 parts by weight, preferably 0.4 part, per 100 parts of butyl rubber. We have found "Polyac" to be particularly effective although other non-sulfur vulcanizing agents for butyl rubber may be used.

For the fibrous component of our adhesive we preferably employ a mineral fiber, such as comminuted asbestos, although organic fibers of various types, such as cotton flock may also be used. Preferably, the fibrous component in the adhesive comprises about 75 to 200 parts by weight per 100 parts of butyl rubber, and we have obtained particularly good results using 150 parts by weight.

As the volatile portion of our adhesive, we may employ any of the relatively volatile solvents of the hydrocarbon type, e. g. petroleum fractions, or coal tar fractions such as toluene, solvent naphtha, and the like, or we may employ chlorinated hydrocarbons such as carbon tetrachloride. Mixtures of hydrocarbons and chlorinated hydrocarbons may also be used. We have found particularly suitable a petroleum hydrocarbon fraction known commercially as "Textile Spirits," which has a boiling range of about 140° to 200° F. The quantity of solvent used is determined by the viscosity desired in the final product and will, of course, vary with the types and quantities of the components of the adhesive. The quantity for any given product can be readily determined.

In our butyl rubber adhesive we may also incorporate a mineral filler, such as whiting (powdered limestone), green slate flour and the like. Indeed, an important technical and economic advantage of our adhesive is that it will tolerate substantial quantities of filler. For example, we may use up to say 150 parts by weight of filler, but preferably, we use about 100 parts by weight or less of filler per 100 parts of butyl rubber. If desired, however, the filler may be eliminated altogether.

In preparing the adhesive of the invention, we have found the following procedure to be satisfactory, although, as will be apparent to those skilled in the art, the adhesive may be prepared by other methods. The butyl rubber, e. g. GR-I, is first mixed with the non-sulfur vulcanizing agent, when used, in a rubber mixer, such as a Banbury, for about two minutes. The action of the mixer heats the compound to an elevated temperature e. g. approximately 250° F. which causes a partial cure and increases somewhat the strength of the final adhesive product. After the butyl rubber and the vulcanizing agent have been mixed, the batch is removed and sheeted out on an open rubber mill and then chopped into small pieces. When the vulcanizing agent is not employed, the butyl rubber is sheeted out on a mill directly. The resin component, e. g. polymerized rosin, and the chopped butyl rubber are then dissolved in the solvent in an agitated mixing vessel, such as a churn. To facilitate solution, it is preferable to crush the resin into relatively small pieces before charging into the churn. The solution is then transferred to a heavy duty mixer such as a pug mill and the filler, if used, is added to the solution, followed by the fibrous component, and the batch thoroughly mixed to insure homogeneous blending of all the components. The adhesive is adjusted, if necessary, to desired viscosity with additional quantities of solvent. The selection of the final viscosity will depend in large measure upon the use to which the adhesive will ultimately be put. In preparing a construction adhesive, a use for which our adhesive is particularly suited, we prefer to adjust the final viscosity to 12° to 18° MacMichael. The viscosity should not be below about 4° or above about 20° MacMichael. The above viscosity values are based on measurements at 77° F. and 20 R. P. M. using large cup, 1 cm. spindle, 4 cm. immersion, 60 sec. reading, #18 wire.

The following specific example is further illustrative of our invention, all parts being by weight.

A batch consisting of 100 parts of GR-I-70 and 0.4 part of "Polyac" was added to a Banbury and mixed for two minutes, during which time the temperature rose to 250° F. The batch was then removed from the Banbury, sheeted on an open mill immediately and cut into pieces approximately 1" in diameter with a rubber shredder. A small amount of whiting was added during the chopping to prevent the pieces of the GR-I Polyac blend from sticking together. In a churn of a type commonly used for making adhesive cements, 75 parts of Poly-pale resin, previously crushed, and the milled batch of GR-I and Polyac were dissolved in about 300 parts of textile spirits. The mixture was stirred until it was smooth and homogeneous. This required about 24 hours. The resulting smooth blend was then run through a 4-mesh screen and charged to a pug-mill. Agitation of the blend was started and 100 parts of whiting and 100 parts of asbestos were added and the mixture was agitated until thoroughly mixed. The viscosity of the final product was adjusted, by the addition of small quantities of textile spirits, to 12–18° MacMichael at 77° F. and 20 R. P. M. using large cup, 1 cm. spindle, 4 cm. immersion 60 sec. reading, #18 wire.

The resulting product had the following composition:

| Components: | Parts by weight |
|---|---|
| GR-I-70 | 100 |
| Polyac | 0.4 |
| Poly-pale resin | 75 |
| Whiting | 100 |
| Asbestos | 100 |
| Textile spirits | 306 |
| | 681.4 |

This adhesive was found to have a heat strength of 300° F.+ and good specific adhesion.

Heat strength is determined in the following manner: A 1" x 3" piece of cotton duck is cemented, by means of the adhesive to be tested, to a 1" x 6" piece of 1" steel plate. The ends of the two surfaces are overlapped by 1" so that there is a 1 sq. in. bond. The test piece is then dried for one month at room temperature. The steel plate is suspended in a vertical position, with the duck hanging downwardly, in a forced convection, variable temperature oven and a one pound weight is suspended from the duck. The test is begun at room temperature and the temperature is increased in 5° F. increments at 5 min. intervals. The test is carried on until failure of the bond occurs or until 300° F. is reached, whichever occurs first. The heat strength is recorded as the temperature at which the bond fails, or 300° F.+, if no failure occurs during the test.

Specific adhesion is determined as follows: A 2" square perforated metal plate is bonded, by means of the adhesive to be tested, to a flat steel plate and allowed to dry for one month. The perforated plate is then separated from the flat steel plate by a tensile testing machine and the distribution of the adhesive on the two surfaces is observed. If the bond failure has occurred within the adhesive film rather than at the adhesive-metal interfaces the adhesive is said to have good specific adhesion.

The expression "isobutylene-conjugated diolefin copolymer" is used in the claims to mean butyl rubber, which, as noted hereinabove, is characterized by low chemical unsaturation as compared with natural rubber and synthetic elastomers, such as butadiene-styrene copolymers.

Since certain changes may be made in the invention without departing from the scope thereof, as defined in the appended claims, it is intended that all matter contained in the above description shall be interpreted as illustrative and not in a limiting sense.

We claim:

1. An adhesive composition characterized by good specific adhesion and high heat strength, which comprises a volatile solvent and for each 100 parts of an isobutylene-conjugated diolefin copolymer, 150 parts by weight of comminuted asbestos, up to 150 parts by weight of a mineral filler, 0.1 to 1.5 parts of a non-sulfur vulcanizing agent, and about 50 to 100 parts by weight of a resinous material comprising at least 50% of polymerized rosin.

2. An adhesive composition characterized by good specific adhesion and high heat strength, which comprises a volatile hydrocarbon solvent and for each 100 parts by weight of an isobutylene-conjugated diolefin copolymer, 75 to 200 parts by weight of comminuted asbestos, up to 150 parts by weight of a filler, 0.1 to 1.5 parts by weight of a non-sulfur vulcanizing agent, and about 50 to 100 parts by weight of resinous material comprising at least 50% of polymerized rosin.

3. An adhesive composition characterized by good specific adhesion and high heat strength which comprises a volatile hydrocarbon solvent and for each 100 parts by weight of an isobutylent-conjugated diolefin copolymer, 150 parts by weight of comminuted asbestos, 0.1 to 1.5 parts by weight of a non-sulfur vulcanizing agent, up to 100 parts by weight of mineral filler, and about 50 to 100 parts by weight of a resinous material comprising at least 50% of polymerized rosin.

4. An adhesive composition characterized by good specific adhesion and high heat strength which comprises a volatile hydrocarbon solvent and for each 100 parts by weight of an isobutylene-conjugated diolefin copolymer, 100 parts by weight of comminuted asbestos, 0.4 part by weight of a non-sulfur vulcanizing agent, up to 100 parts by weight of mineral filler, and 75 parts by weight of polymerized rosin.

5. An adhesive composition characterized by good specific adhesion and high heat strength which comprises a volatile hydrocarbon solvent having a boiling range of about 140° to 200° F. and for each 100 parts by weight of an isobutylene-conjugated diolefin copolymer, 100 parts by weight of comminuted asbestos, 0.4 part by weight of a non-sulfur vulcanizing agent, 100 parts by weight of whiting, and 75 parts by weight of polymerized rosin.

6. An adhesive composition having good specific adhesion and high heat strength, which comprises a volatile solvent, an isobutylene-conjugated diolefin copolymer, comminuted fibrous material, and a resinous material containing at least 50% by weight of polymerized rosin, the last three mentioned constituents being present in the ratio of 75 to 200 parts by weight of comminuted fibrous material and 50 to 100 parts by weight of resinous material for each 100 parts by weight of isobutylene-conjugated diolefin copolymer.

7. An adhesive composition having good specific adhesion and high heat strength, which contains for each 100 parts by weight of an isobutylene-conjugated diolefin copolymer, from 75 to 200 parts by weight of comminuted fibrous material and from 50 to 100 parts by weight of polymerized rosin and also contains an amount of volatile solvent such as to produce a composition having a viscosity of 4° to 20° MacMichael.

8. An adhesive composition having good specific adhesion and high heat strength, which contains for each 100 parts by weight of an isobutylene-conjugated diolefin copolymer, from 75 to 200 parts by weight of comminuted asbestos, from 50 to 100 parts by weight of polymerized rosin, from .1 to 1.5 parts by weight of a non-sulfur vulcanizing agent, and an amount of volatile solvent such as to produce a composition having a viscosity of from 4° to 20° MacMichael.

JOHN B. KIRKLAND.
RAYMOND R. LAMM.

REFERENCES CITED

The following references are of record in the file of this patent:

UNITED STATES PATENTS

| Number | Name | Date |
|---|---|---|
| 2,319,959 | Tierney | May 25, 1943 |
| 2,377,647 | Pragoff | June 5, 1945 |

Certificate of Correction

Patent No. 2,537,766 January 9, 1951

JOHN B. KIRKLAND ET AL.

It is hereby certified that error appears in the printed specification of the above numbered patent requiring correction as follows:

Column 4, line 58, for "faiure" read *failure*; column 5, lines 37 and 38, for "isobutylent-conjugated" read *isobutylene-conjugated*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*